United States Patent
Guinart et al.

(10) Patent No.: US 11,440,359 B2
(45) Date of Patent: Sep. 13, 2022

(54) STRATEGY FOR RETURNING TO SERVICE A WHEEL UNIT DECLARED TO HAVE BECOME DETACHED IN A MOTOR VEHICLE TYRE PRESSURE MONITORING SYSTEM TPMS

(71) Applicants: Continental Automotive France, Toulouse (FR); Continental Automotive GmbH, Hannover (DE)

(72) Inventors: Nicolas Guinart, Toulouse (FR); Olivier Fudulea, Tours (FR)

(73) Assignees: Continental Automotive France; Continental Automotive GmbH

( * ) Notice: Subject to any disclaimer, the term of this patent is extended or adjusted under 35 U.S.C. 154(b) by 874 days.

(21) Appl. No.: 16/323,598

(22) PCT Filed: Aug. 25, 2017

(86) PCT No.: PCT/FR2017/052277
§ 371 (c)(1),
(2) Date: Feb. 6, 2019

(87) PCT Pub. No.: WO2018/042112
PCT Pub. Date: Mar. 8, 2018

(65) Prior Publication Data
US 2019/0176546 A1    Jun. 13, 2019

(30) Foreign Application Priority Data
Aug. 30, 2016   (FR) ..................................... 1658044

(51) Int. Cl.
B60C 23/04    (2006.01)
(52) U.S. Cl.
CPC ............................... B60C 23/0481 (2013.01)
(58) Field of Classification Search
CPC .................................................. B60C 23/0481
See application file for complete search history.

(56) References Cited

U.S. PATENT DOCUMENTS

| | | | | |
|---|---|---|---|---|
| 5,717,376 A | * | 2/1998 | Wilson | B60C 23/0433 340/447 |
| 2003/0131657 A1 | * | 7/2003 | Anderson | B60C 23/0435 340/442 |

(Continued)

FOREIGN PATENT DOCUMENTS

| | | |
|---|---|---|
| FR | 2874271 A1 | 2/2006 |
| GB | 2429294 A | 2/2007 |

OTHER PUBLICATIONS

International Search Report and Written Opinion for International Application No. PCT/FR2017/052277, dated Nov. 24, 2017—7 pages.

*Primary Examiner* — Richard M Camby
(74) *Attorney, Agent, or Firm* — RatnerPrestia (57) ABSTRACT

A method and TPMS system including a central unit and wheel units. Each wheel unit including a pressure sensor, regularly transmitting pressure and radial acceleration measurements to the central unit. The latter used to calculate a detachment parameter for the wheel unit. A test module determines whether each wheel unit is in a detached or operational state. A return-to-service module toggles the state of a wheel unit from the detached to the operational state if: since the wheel unit was declared detached, a pressure less than or equal to a reference atmospheric pressure is measured while the vehicle was at rest, and if after this rest, at least one of: the detachment parameter has not attained a nominal detachment threshold in a first movement time; an attachment index corresponding to a particular shape of a measurement signal of the wheel unit has been detected under specific evaluation conditions, occurs.

14 Claims, 5 Drawing Sheets

(56) References Cited

U.S. PATENT DOCUMENTS

| | | | |
|---|---|---|---|
| 2007/0090928 A1* | 4/2007 | Deniau | B60C 23/0481 340/447 |
| 2007/0257666 A1 | 11/2007 | Laure et al. | |
| 2008/0243327 A1* | 10/2008 | Bujak | B60W 30/12 340/442 |
| 2010/0083747 A1* | 4/2010 | Fink | B60C 23/061 73/146.5 |
| 2016/0178481 A1* | 6/2016 | Fudulea | G01M 17/013 701/33.9 |

* cited by examiner

STRATEGY FOR RETURNING TO SERVICE A WHEEL UNIT DECLARED TO HAVE BECOME DETACHED IN A MOTOR VEHICLE TYRE PRESSURE MONITORING SYSTEM TPMS

CROSS REFERENCE TO RELATED APPLICATIONS

This application is the U.S. National Phase Application of PCT International Application No. PCT/FR2017/052277, filed Aug. 25, 2017, which claims priority to French Patent Application No. 1658044, filed Aug. 30, 2016, the contents of such applications being incorporated by reference herein.

FIELD OF THE INVENTION

The invention relates to the technical field of systems for automatically checking the pressure of the tires of an automotive vehicle (known as TPMS, for "Tire Pressure Monitoring System"). In the United States, the "Tread Act" of 2005 has imposed the use of a tire pressure checking technology to inform the driver when these tires have a serious inflation problem. This technology has become compulsory for all new vehicles of less than 3.5 tonnes produced after the Sep. 1, 2007. Following the North American example, the installation of TPMS has become compulsory in Europe from November 2014 for all brand new vehicles.

BACKGROUND OF THE INVENTION

There exist two principal families of tire pressure checking systems: direct TPMS systems and indirect TPMS systems. An indirect system calculates the pressure of the tires in a partial and indirect manner, on the basis of the measurement of a quantity other than the pressure, for example on the basis of the rotation speed of the tread of the tires (which depends on the outside diameter of the tire, itself dependent on the pressure). The ABS can make it possible to detect this variation in the rotation of the tire. Other indirect systems integrate the measurement of the vibration of the tires or study the result of the changes of load when accelerating, braking or turning. Indirect TPMS systems exhibit the advantage of using hardware (ABS for example) already present in the tire but they are generally less precise than direct TPMS systems.

Direct systems are produced with the aim of combatting pressure variations relating to temperature changes and frictional rubbing related to these variations, but above all of detecting a puncture of one of the tires which could lead to the loss of control of the vehicle, the objective being that any problem (pressure too low for example because of a pressure leak, pressure sensor out of service, etc.) is signaled within 10 minutes.

SUMMARY OF THE INVENTION

An aspect of the invention relates solely to direct TPMS systems which directly measure the pressure inside the tires of the vehicle with the aid of TPMS measurement devices also called "wheel units".

Each wheel unit is installed inside the tire, either fixed on the rim of the wheel, or stuck on the internal face of the tread of the tire, or fixed to the tip of the valve. It comprises in particular a pressure sensor of micro-electromechanical type, a temperature sensor, a processor, and an emitter for dispatching information to an onboard computer of the vehicle by radio frequencies, as well as a casing in which the above-listed elements are housed.

In order to economize on the energy necessary for the operation of the wheel unit and more broadly of the TPMS measurement system, which is useful only when the vehicle is moving, the TPMS system moreover comprises means for detecting whether or not the vehicle is in motion. For example, each wheel unit moreover integrates a radial accelerometer. When an acceleration is detected, this information is transmitted by the wheel unit to the onboard computer. When the accelerometer does not detect any acceleration, the wheel unit does not perform any transmission and the onboard computer records an "at rest" status for the vehicle.

The known direct TPMS systems integrate means for determining the operational/detached state of the wheel units, which are able to determine whether a wheel unit is in place or whether it is detached and is therefore non-operational, for example either because the casing of the wheel unit has detached from the rim or from the tread of the tire or has been ejected from the valve, or else because the pressure sensor (or some other or several elements of the wheel unit) has been ejected from said casing. It is important to know the state, detached or not, of a wheel unit since, generally, the detachment of a wheel unit compromises the integrity of the measurements that it provides, for example because a detached wheel unit can rapidly become defective in terms of data transmission or in terms of pressure measurement; furthermore, by rubbing against the tire it may, in the most critical scenarios, damage the latter or generate dust that might block the measurement input of the wheel unit, thus resulting in a measured pressure which appears to be correct although the tire is leaking.

When a wheel unit is declared detached, a signal is emitted for the attention of the driver of the vehicle to indicate to the latter that the pressure of the tires can no longer be checked because of defective hardware. There does not currently exist any operational means of making a wheel unit declared "detached" revert to its operational state. Consequently, any wheel unit which has detached is scrapped, be it damaged or not.

An aspect of the invention is aimed at allowing the reuse of a wheel unit previously declared detached but not having sustained any damage. An aspect of the invention is a tire pressure checking system enhanced with a new function, which allows savings to be made by avoiding the wastage of functional hardware. Another aspect of the invention is a new function requiring little calculation time and few computing resources.

Another aspect of the invention offers automatic return to service of a previously detached wheel unit, without additional action by the operator or garage mechanic who puts the wheel unit back in place. Thus for example, no reinitialization of the wheel unit is required. The system is autonomous in respect of putting the refitted wheel unit back into service.

In a preferred version, an aspect of the invention also provides a diagnosis of a detached wheel unit so as to aid an operator in their decision to scrap the detached wheel unit or put it back in place.

To this end, an aspect of the invention proposes a system, hereinafter called TPMS system, for checking the pressure of the tires of an automotive vehicle, which comprises a central unit and wheel units, each wheel unit comprising in particular a pressure sensor and an emitter for allowing transmissions from the wheel unit to the central unit, among which are recurrent transmissions, called pressure checking transmissions here, taking place at a first frequency and each comprising pressure measurements of the tire and measurements used to calculate a detachment parameter for the wheel unit.

Other types of transmission (such as diagnosis transmissions), the latter being optional, taking place at other frequencies and possibly relating to other data, will be defined further on.

It should be noted that the measurements used to calculate the detachment parameter may be measurements of radial accelerations obtained from a radial accelerometer included in the wheel unit; as a variant, the measurements may be measurements of, shocks, obtained from sensors of piezoresistive type, or else measurements of the current passing through an inductance housed in the casing of the wheel unit and fixed to the pressure sensor as taught by document FR 2 874 271.

In a usual manner, the TPMS system comprises a test module configured to determine whether each wheel unit is in a detached state or in an operational state, the wheel unit being declared detached if the detachment parameter is greater than or equal to a predetermined nominal threshold of detachment. This test module can be integrated into the central unit or into each wheel unit.

The TPMS system according to an aspect of the invention is characterized in that it moreover comprises a return-to-service module configured to, when a wheel unit has been detected as being in the detached state, toggle the state of the wheel unit from the detached state to the operational state if and only if the following two conditions are fulfilled, namely:
- a first condition according to which, since the wheel unit was declared detached, a pressure less than or equal to a reference atmospheric pressure has been measured while the vehicle was at rest,
- a second condition according to which, after the above-mentioned rest (that is to say from the resumption of movement), at least one of the following two criteria is satisfied:
    - First criterion: the detachment parameter has not attained the nominal detachment threshold in a first movement time;
    - Second criterion: an attachment index is detected under specific predetermined evaluation conditions.

An aspect of the invention also relates to a method for returning to service a wheel unit previously declared detached, in a TPMS system for checking the pressure of the tires of an automotive vehicle comprising wheel units which can be in an operational state or in a detached state, a wheel unit being declared detached when a detachment parameter is greater than or equal to a predetermined nominal threshold of detachment. The method according to an aspect of the invention is characterized in that the state of the wheel unit previously declared detached is toggled from the detached state to the operational state if and only if the two previously defined conditions are fulfilled.

An aspect of the invention thus proposes for the first time a TPMS system able to automatically toggle a wheel unit from the detached state to the operational state so as to return to service a wheel unit which had detached and had been correctly put back in place.

The first condition conveys the fact that the tire has been removed and therefore that it is probable that the tire has been checked and repaired, if necessary, and that the detached wheel unit has been put back in place (that is to say that it is probable that the wheel unit has been fixed back again on the rim of the wheel or on the tread of the tire or rehoused on the valve of the wheel or that the pressure sensor—or other element ejected from the wheel unit—has been refitted in its housing within the wheel unit).

The reference atmospheric pressure with which are compared the pressures measured by the detached wheel unit is predetermined and stored in a memory of the wheel unit and/or of the central unit. It is for example equal to 1 bar or 1 atm (1 013 hPa); it may optionally be determined as a function of the presumed place of sale of the vehicle, or indeed be adjusted in real time as a function of the outside ambient temperature, such adjustment seeming, however, to unnecessarily consume computing resources in regard to the aim sought.

This reference atmospheric pressure is preferably slightly greater than 1 bar, for example equal to 1.1 bar, so as to provide a margin which takes account of the highest pressures that have been recorded at the terrestrial surface to date (record of 1.087 bar).

The second condition is aimed at determining whether the wheel unit has been put back in place correctly and whether it is now properly attached. Once the operator has put the wheel unit back in place on the tread of the tire (or on the rim or the valve), the system is thus autonomous in deciding or otherwise the resumption of activity of the reinstalled wheel unit.

For this second condition, two types of criterion are proposed: one using the detachment parameter, calculated moreover by the test module to determine the detached or operational state of the wheel unit, and the other using an attachment parameter, specially calculated for the occasion.

Thus, the first criterion employs the parameter and the threshold continually used by the test module to determine the detached or operational state of each wheel unit, a wheel unit being declared detached by the test module if the nominal detachment threshold is attained, the wheel unit being considered to be operational in the converse case. The calculation of the detachment parameter according to an aspect of the invention is established for example on the basis of acceleration measurements performed by the wheel unit at a predetermined frequency and over a sliding window of several samples (for example the acceleration measurements are performed every 16 seconds, and the detachment parameter is calculated over the last 30 acceleration measurements). The detachment parameter is compared with the nominal detachment threshold each time it is calculated.

Advantageously, for faster return to service, the frequency of measurement of the acceleration leading to the evaluation of the non-detachment criterion for return to service is higher than the frequency imposed for the standard supervision of the detachment of the wheel unit.

The use of this first criterion therefore presents the advantage of not requiring any additional code line (outside of those returning to the start of the verification of the detachment criterion in the test module). This solution is therefore optimal in terms of computing resources but it is somewhat slow since the first movement time must be chosen to be sufficiently long, for example 10 minutes.

The use of the second criterion according to which an attachment index, provided by a particular shape of a measurement signal of the wheel unit, has been detected under specific evaluation conditions comes within a logic inverse to the previous criterion.

In a possible embodiment, the wheel unit is furnished with a radial acceleration sensor and the signal used to evaluate the attachment index is a radial acceleration signal resulting from measurements performed by the radial acceleration sensor (signal constructed on the basis of the radial acceleration measurements logged by said sensor).

In this embodiment,
- in the case of a wheel unit attached to the tip of the valve or fixed on the rim:
  - the particular shape representative of the attached state is a sinusoid of amplitude of the order of 1 g, that is to say lying between 0.7 g and 1.3 g.
  - and the specific evaluation conditions are that the vehicle is in motion.
- in the case of a wheel unit fixed on the internal face of the tread of the tire:
  - the particular shape representative of the attached state is the substantially periodic presence of troughs corresponding to the imprint of the tire on the ground, which troughs have a maximum width $T_{FTP}$ and a periodicity $T_{360°}$ exhibiting a substantially constant ratio $T_{FTP}/T_{360°}$ lying between 4% and 10%),
  - and the specific evaluation conditions are that the speed of the vehicle is less than 20 km/h. Indeed, this characteristic signal is not observed for a detached wheel unit when the vehicle is moving at low speed. The wheel unit not knowing the linear speed of the tire (or of the vehicle), verification may pertain to the radial acceleration, the radial acceleration and the linear speed being directly related. Thus for example, the condition "radial acceleration less than or equal to 4 g" is substantially equivalent to the condition "speed of the vehicle less than or equal to 20 km/h".

Usually, independently of the type of fixing of the wheel unit (valve, rim or tire) and independently of the criterion used (detachment parameter or attachment index), the determination of the characteristic parameters/signals used is obtained by a particular step of high-frequency sampling of the measurement signal (of the order of a kHz).

The second criterion therefore assumes a complete rewriting of the calculations to be performed and requires its own code lines. This solution is the least favorable from the computing standpoint insofar as it appreciably increases the size of the code but it is the fastest since the specific evaluation conditions are generally attained before the first movement time.

In a preferred version, the TPMS system according to an aspect of the invention moreover comprises a diagnosis module configured to:
- calculate one or more level(s) of damage sustained by a wheel unit declared detached, which is(are) chosen from among: the cumulative movement time which has elapsed since the wheel unit was declared detached; the number of high-intensity shocks recorded for the wheel unit since it was declared detached, a high-intensity shock being defined by a derivative of order 3 of the position of the wheel unit which, in absolute value, is greater than or equal to 500 g/ms (abrupt variation of the radial acceleration of the wheel unit);
- compare each calculated level of damage with a corresponding predetermined threshold of damage. The diagnosis module can be integrated into the central unit or, preferably, into the wheel unit (each wheel unit then comprising its own diagnosis module).

Preferably, the diagnosis module is moreover configured to command a modification of the sampling of the acceleration of a wheel unit declared detached so as to increase the frequency of the measurements of radial acceleration of the detached wheel unit so long as the vehicle is in motion. This fast sampling can be conditioned on the speed of the vehicle, that is to say be commanded only if the wheel has attained a given minimum rotation speed.

In this preferred version of an aspect of the invention including diagnosis modules, several options can be envisaged.

A first option consists in forewarning the operator that the wheel unit is very probably defective and ought not to be reinstalled. Accordingly, for example, the wheel unit comprises a telltale representative of a damaged state, this telltale being able to be activated by the diagnosis module if at least one calculated damage level is greater than or equal to the corresponding threshold of damage or if all the calculated damage levels are greater than or equal to their respective threshold of damage.

A second option consists in prohibiting the return to the operational state of the wheel unit reinstalled by the operator if it is potentially damaged. In this case, the return-to-service module of the TPMS system is moreover configured to, when a wheel unit is detected as being in the detached state, toggle the state of the wheel unit from the detached state to the operational state if and only if, in addition to the first condition and the second condition defined supra, a third condition is also fulfilled, the third condition being that each calculated level of damage is less than or equal to the corresponding threshold of damage.

A third option consists in combining the previous two options.

BRIEF DESCRIPTION OF THE DRAWINGS

Other details and advantages of aspects of the present invention will become apparent on reading the following description, which refers to the appended schematic drawings and pertains to preferential embodiments provided by way of nonlimiting examples.

FIGS. 4 to 7 are charts representing examples of signals used as attachment parameters (the abscissa axis representing time) for various types of fixing of a wheel unit (valve/rim and tire), FIGS. 4 and 6 being characteristic of an attachment of the wheel unit, FIGS. 5 and 7 conveying a defect of attachment of the wheel unit.

More precisely.

DETAILED DESCRIPTION OF THE PREFERRED EMBODIMENTS

Figure 1:
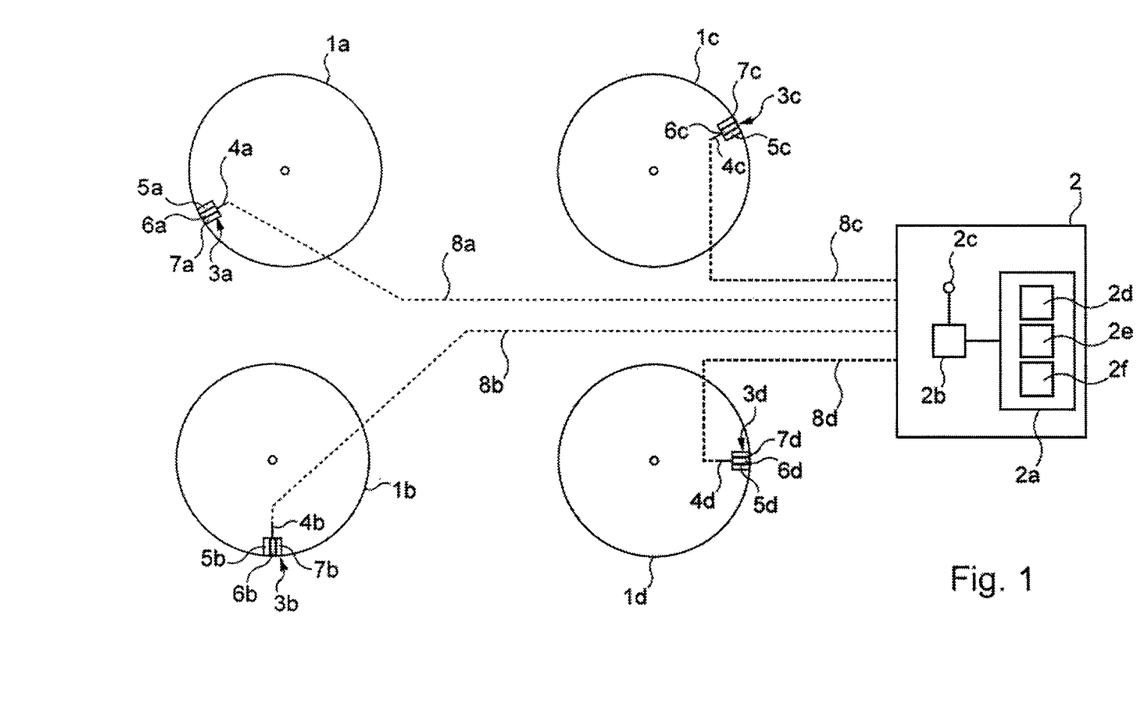
FIG. 1 is a basic diagram of an example of a TPMS system for checking the pressure of the tires of a vehicle able to implement a method according to an aspect of the invention.

With reference to the basic diagram of FIG. 1, the four tires 1a to 1d of an automotive vehicle (not represented) are each equipped with a wheel unit 3a to 3d. Each wheel unit 3a to 3d comprises:
- an antenna (or emitter) 4a to 4d which emits signals carried by radiofrequency links 8a to 8d to a central unit 2;
- a pressure sensor 5a to 5d which measures the pressure inside the tire 1a to 1d;
- a microcontroller 6a to 6d;
- an accelerometer 7a to 7d able to measure radial accelerations.
- a temperature sensor (not represented) which measures the temperature inside the tire. This sensor is advantageous in that it makes it possible to determine in real time a recommended pressure adjusted as a function of the temperature, with which adjusted recommended pressure the pressures actually measured are compared so as to be able to detect a problem of under-inflation (and alert the driver thereof), which under-inflation may be due to a significant load of the vehicle or to a leak of the tire. Such a temperature sensor is imposed by standard in certain countries.

Each wheel unit 3a to 3d is identified by an identifier which is unique.

Each wheel unit 3a to 3d transmits a data packet to the central unit 2 according to a first constant frequency, for example every 16 seconds. At each pressure check transmission, this data packet comprises:
- the identifier of the wheel unit 3a to 3d concerned;
- all of the pressure measurements, such as are deduced from the corresponding pressure sensor 5a to 5d, logged over the last measurement period, the expression "last measurement period" designating the period which has elapsed between the previous pressure check transmission and the current pressure check transmission;
- all of the measurements of radial acceleration, such as are deduced from the accelerometer 7a to 7d, logged over the last measurement period,
- all of the temperature measurements logged over the last measurement period.

The central unit 2 comprises the following elements: a microcontroller 2a, a receiver 2b and an antenna 2c, the microcontroller 2a comprising, inter alia, a test module 2d, a return-to-service module 2e and a diagnosis module 2f. This central unit 2 thus receives the data originating from the wheel units 3a to 3d.

According to an advantageous characteristic of an aspect of the invention, each wheel unit 3a-3d moreover comprises at least three counters REC_1, REC_2 and REC_3 for the synchronization of the operations that the microcontroller 6a-6d of the wheel unit is responsible for performing. These counters impose faster or slower recurrences. REC_1 imposes the slowest recurrence, for example 64s, REC_2 an intermediate recurrence, for example 16s, REC_3 the fastest, for example 4s.

With each wheel unit 3a to 3d is moreover associated, in the central unit 2 or in the wheel unit, a state flag indicating whether the wheel unit 3a-3d is in an operational state or whether it is in a detached state. The state flag initially contains a value (e.g. 0) representative of an operational state. The state of each wheel unit 3a-3d is checked regularly: at each acceleration measurement that it performs or according to a second predetermined frequency, the wheel unit calculates a detachment parameter, referenced LoPr (for "Loose Parameter"), which is here the percentage of negative accelerations measured, calculated over the last thirty acceleration measurements (or over some other sliding window). This detachment parameter LoPr is transmitted to the central unit and is compared with a nominal detachment threshold $TH_{LO}$ stored in memory in the test module. If the detachment parameter is greater than the nominal detachment threshold, the state indicator is changed into "detached state" (that is to say that a value representative of the detached state, in this instance 1, is recorded in the state flag). If the state flag is stored in memory in the central unit, this change is performed directly by the test module. If the state flag is stored in memory in the wheel unit, a change order is transmitted by the test module of the central unit to the wheel unit.

Figure 2:
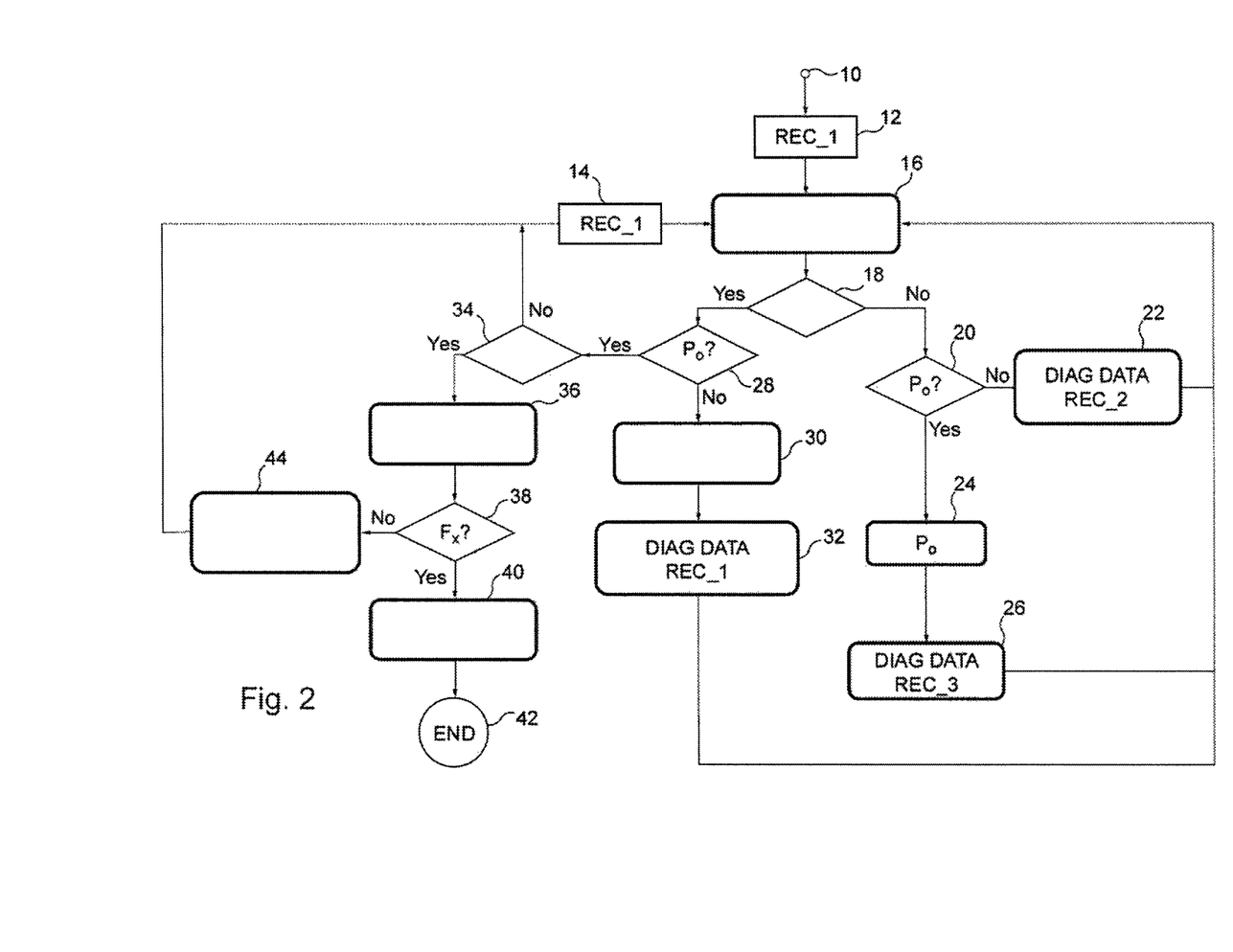
FIG. 2 is a logic chart of the steps of an exemplary implementation of the method according to an aspect of the invention for the central unit.

FIG. 2 illustrates a method according to an aspect of the invention for returning to service a wheel unit whose state flag indicates a detached state (starting point 10).

Let us assume that a wheel unit is declared detached. The driver is then warned of the existence of a problem relating to the pressure check of the tires of their vehicle. It may be assumed that they then decide to go to a garage mechanic to check the state of their tires.

A wheel unit having been declared detached (at 10), the counter REC_1 (the slowest) is triggered in step 12. The box 16 consists, for the microcontroller 6a-6d of the wheel unit concerned, in waiting for the next recurrence which will be triggered by one or the other of the counters REC_1 to REC_3 of the wheel unit.

Once the microcontroller has been woken at 16, it is verified, in step 18, whether the vehicle is in motion. To this end, the central unit 2 preferably comprises another indicator, termed motion flag, which can take a first value (for example 1) if the vehicle is in motion and a second value (in the example, 0) if it is at rest. The motion of the vehicle can be detected in various ways; it can be deduced from the radial accelerations transmitted by the four wheel units or from data provided by an odometer of the vehicle (which measures the speed of the vehicle on the basis of measurements performed by other sensors), etc.

According to an advantageous characteristic of an aspect of the invention, with each wheel unit 3a-3d is associated another indicator, called here flag $P_0$, indicating whether a pressure less than or equal to a reference atmospheric pressure has been measured by the wheel unit in question. The flag $P_0$ can be stored in memory in the central unit 2 or in the corresponding wheel unit. The reference atmospheric pressure, used for the comparison, is advantageously chosen to be equal to 1.1 bar. The flag $P_0$ initially contains a value (for example 0) representative of the fact that no pressure less than or equal to the reference atmospheric pressure has been measured by the wheel unit. At each pressure check transmission by the wheel unit, if the latter is in the detached state (such as indicated by the state flag of the wheel unit) and if the vehicle is at rest (such as indicated by the motion flag), the measured pressures transmitted are compared with the reference average atmospheric pressure. This comparison may, as a variant, be performed by the wheel unit (in particular if the flag $P_0$ is stored in memory in the wheel unit) at each pressure measurement and if the vehicle is at rest. If a measured pressure is less than or equal to the reference atmospheric pressure, the flag $P_0$ is changed for a value (in the example 1) representative of the fact that a pressure less than or equal to the reference atmospheric pressure has been measured by the wheel unit.

On exiting step 18 (vehicle in motion?), if the vehicle is not in motion (the driver has arrived at the garage mechanic), the method continues via the verification, in step 20, of the flag $P_0$.

If no pressure less than or equal to the reference atmospheric pressure has been measured, that is to say if $P_0$ is still equal to 0 (the garage mechanic has not yet removed the tire whose wheel unit has failed), the method continues via step 22, which comprises the triggering of the counter REC_2, which fixes an appointment for the next recurrence awaited in step 16. Optionally, step 22 also comprises the transmission by the wheel unit to the central unit 2 of diagnosis data DIAG DATA allowing the diagnosis module 2f to calculate at least one level of damage such as the number of high-intensity shocks recorded for the wheel unit since it was declared detached.

If the flag $P_0$ indicates, in step 20, that a pressure less than or equal to the reference atmospheric pressure has been measured (the vehicle is still at the garage mechanic since still at rest, and the tire has been removed, it is perhaps still so), then the flag $P_0$ is reinitialized at 24. In step 26 which follows, the counter REC_3 is triggered and optionally the wheel unit transmits diagnosis data DIAG DATA to the central unit 2 allowing the diagnosis module 2f to calculate at least one level of damage.

On exiting step 18 (vehicle in motion?), if the vehicle is in motion, it is verified, in step 28, whether a pressure less than or equal to the reference atmospheric pressure has been logged among the last measurements transmitted by the wheel unit. In practice, it suffices for the wheel unit to read its flag $P_0$.

If such is the case (the tire has been removed, since $P_0$ has been measured, and then put back, since the vehicle is again in motion), there is reason to verify whether the wheel unit has been put back in place correctly.

To this end, in a possible version in which the second criterion defined above is applied, an attachment flag FxPr (for "Fixed Parameter") is calculated in step 36 and it is verified in step 38 whether this attachment flag is raised.

As a variant, the first criterion is applied (use of the detachment parameter LoPr) and the state flag of the wheel unit is used (no step 36). Step 38 then consists, in an analogous manner, in verifying whether this flag is raised.

In both cases, step 38 "Fx?" ("Fx?" signifying "Fixed?") therefore consists in verifying whether the wheel unit is attached, either by verifying an attachment index (FxPr), or by using the detachment parameter (LoPr).

Before this, it is appropriate to make sure in step 34 that the attachment or detachment parameter that will be calculated or used is meaningful, that is to say whether it meets specific evaluation conditions.

If the first criterion is applied, the specific evaluation conditions pertain to the movement time, the latter having to be sufficient, that is to say greater than a given "first movement time". To be able to check this movement time, which corresponds to a number of pressure check transmissions of the wheel unit, provision may for example be made for a counter representing the number of pressure check transmissions of the wheel unit, which counter is incremented at each transmission.

If the second criterion is applied, according to the attachment index chosen, the specific evaluation conditions may pertain:

to the question of knowing whether the vehicle is in motion; in this case, step 34 is unnecessary (the specific evaluation conditions are properly satisfied) since this condition was verified in step 18 and was responded to there in the affirmative, the method then continues systematically via step 36, to the speed of the vehicle or to the radial acceleration (for example if the attachment index is a ground contact imprint, valid below 15 or 20 km/h, that is to say, referred to a value of radial acceleration below 4 g).

If the response to 34 is no, that is to say if it is necessary to wait because the conditions satisfying the evaluation of the parameter/index used have not yet been attained, step 16 is returned to after the counter REC_1 has been triggered in step 14, thus making sure that the microcontroller will be woken subsequently to resume the verifications.

If the response to 34 is yes (the specific evaluation conditions are satisfied), the verification of the state of the wheel unit must be continued and we go to step 36 which consists in calculating or formulating the parameter/index used (for example, step 36 consists in updating the calculation of the detachment parameter LoPr or in formulating a radial acceleration signal). Thereafter, step 38 consists, either in comparing the detachment parameter LoPr with the nominal detachment threshold THLapr, or in searching, in the radial acceleration signal, for a shape representative of the attached state.

Figure 3:
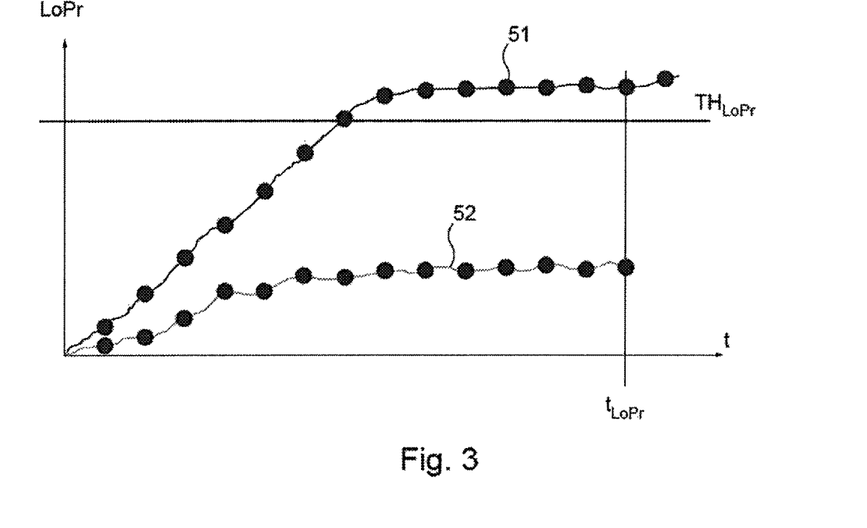
FIG. 3 is a chart representing two examples of evolution over time of the detachment parameter of a wheel unit.

If the detachment parameter has attained the nominal detachment threshold during the first movement time $t_{LoPr}$ (see FIG. 3, curve 51) or if the attachment index is not detected (see FIGS. 5 and 7), the wheel unit is considered not to be correctly put back in place and we go to a step 44 of reinitializing the flag $P_0$ and then to step 14 described previously (triggering of the counter REC_1).

If the detachment parameter has not attained the nominal detachment threshold during the first movement time (see FIG. 3, curve 52) or if the attachment index is detected (see FIGS. 4 and 6), it is considered that the wheel unit has been correctly refitted and that nothing is opposed to its return to service, and the return-to-service module 2e executes step 40 which consists in modifying the state of the wheel unit, that is to say in changing the value of the state flag so that the latter indicates an operational state. Moreover, still in step 40, the flag $P_0$ is reinitialized, that is to say reset to 0 to indicate that no pressure less than or equal to the reference atmospheric pressure has been measured, for the purposes of a next verification as to whether the wheel unit detaches again. The method of restoration thus terminates at 42.

Figure 4:
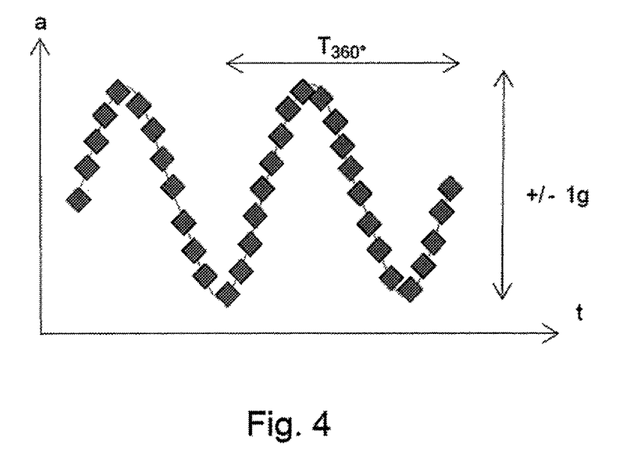
FIG. 4 represents a radial acceleration signal characteristic of an attached state of the wheel unit, in the case of a wheel unit fixed on the valve of the tire or the rim of the wheel.
Figure 5:
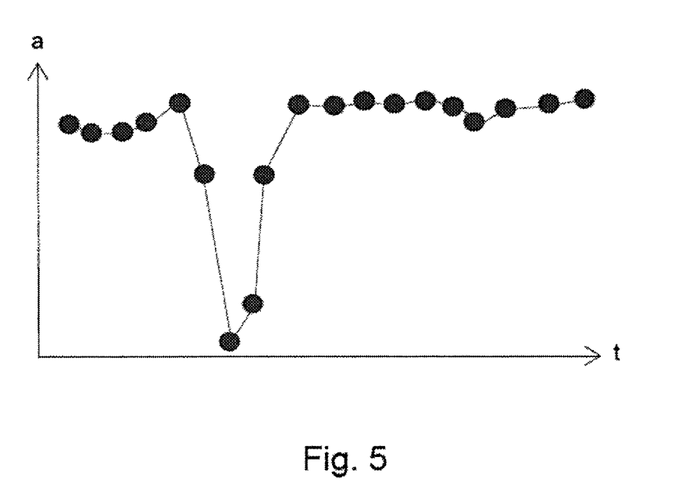
FIG. 5 represents a radial acceleration signal characteristic of a detached state of the wheel unit, in the case of a wheel unit fixed on the valve of the tire or the rim of the wheel.

Concerning the attachment index, FIGS. 4 and 5 illustrate the case of a wheel unit fixed on the valve of the tire or the rim of the wheel. When the wheel unit is correctly fixed (FIG. 4), the signal constructed on the basis of the radial acceleration measurements performed by the accelerometer 7a-7d when the vehicle is in motion exhibits the shape of a sinusoid whose amplitude is of the order of 1 g and whose period $T_{360°}$ corresponds to a revolution of the wheel. When the wheel unit is detached (FIG. 5), this characteristic sinusoid shape is not obtained.

Figure 6:
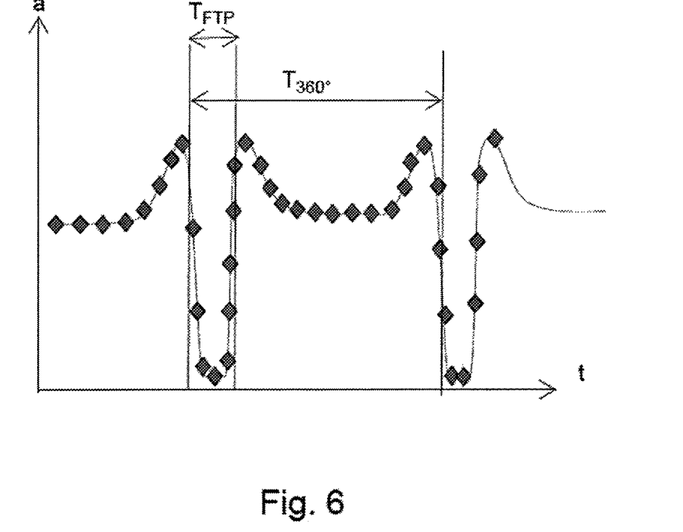
FIG. 6 represents a radial acceleration signal characteristic of an attached state of the wheel unit, in the case of a wheel unit fixed inside the tread of the tire.
Figure 7:
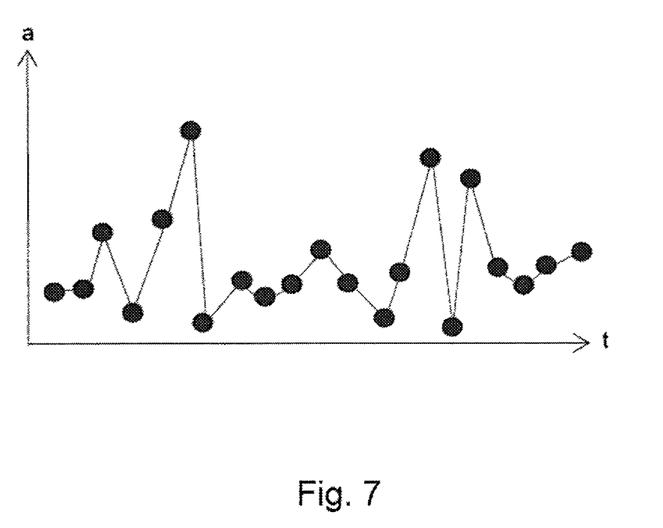
FIG. 7 represents a radial acceleration signal characteristic of a detached state of the wheel unit, in the case of a wheel unit fixed inside the tread of the tire.

FIGS. 6 and 7 illustrate the case of a wheel unit fixed inside the tread. When the wheel unit is correctly fixed (FIG. 6), the signal constructed on the basis of the radial acceleration measurements performed by the accelerometer 7a-7d when the vehicle is moving at less than 20 km/h exhibits a substantially periodic shape with troughs of width $T_{FTP}$ characteristic of the ground imprint of the wheel and a period $T_{360°}$ corresponding to a revolution of the wheel, having a ratio $T_{FTP}/T_{360°}$ lying between 4% and 10%. When the wheel unit is detached (FIG. 7), this characteristic shape is not obtained.

On exiting step 28, if the response is no, that is to say if no pressure less than the reference atmospheric pressure has been measured, optionally, diagnosis data DIAG DATA are measured and recorded in step 30 so as to be transmitted, in step 32, to the central unit 2 for the purposes of calculating at least one level of damage. Step 32 also comprises the triggering of the counter REC_1 (in contradistinction to the diagnosis, this action is not optional), which fixes an appointment for the next recurrence awaited in step 16.

Concerning the various counters of the wheel unit, it will be noted that REC_3 is fast since it corresponds to the moment when the wheel unit observes that the pressure is close to the atmospheric pressure, therefore to the moment when the tire has likely been removed and when the operator will inspect the wheel unit and will decide whether or not to reinstall it. The loop must then be performed rapidly to be able to provide a diagnosis to the operator.

REC_2 corresponds to the moment when the car has been brought to rest but the tire has not yet been removed. It is possible to envisage the case where the operator performs a diagnosis before removing the tire. It is appropriate therefore that the diagnosis report, without being as fast as in the case where the tire is already removed, must reach them fairly quickly. The recurrence of the loop is intermediate.

Finally REC_1 corresponds to the case where the wheel unit is in its tire and the vehicle still moving. It entails making a basic report, for example if provision is made for the diagnosis to be performed or consolidated by the central unit (so as to be communicated thereafter to an operator who would remove the wheel and would plug a diagnosis tool into the central unit). Since the vehicle is moving, there is no immediate urgency in obtaining the diagnosis information, and the recurrence of the loop can be slower.

Aspects of the invention can form the subject of numerous variants provided that they remain within the framework of the appended claims.

The invention claimed is:

1. A tire pressure monitoring system (TPMS) for checking tire pressure of an automotive vehicle, the TPMS system comprising:
    a central unit; and
    at least one wheel unit,
        each of the at least one wheel unit comprising a pressure sensor and an emitter to allow pressure check transmissions from the at least one wheel unit to the central unit taking place at a first frequency and each comprising pressure measurements of the tire and measurements used to calculate a detachment parameter for the at least one wheel unit,
        a test module configured to determine whether each of the at least one wheel unit is in a detached state or in an operational state, the at least one wheel unit being declared detached if the detachment parameter is greater than or equal to a predetermined nominal threshold of detachment; and
    a return-to-service module configured to, when the at least one wheel unit has been detected as being in the detached state, toggle a state of the at least one wheel unit from the detached state to the operational state if and only if the following two conditions are fulfilled:
        a first condition according to which, since the at least one wheel unit was declared detached, a pressure less than or equal to a reference atmospheric pressure has been measured while the vehicle was at rest,
        a second condition according to which, after this rest, at least one of the following two criteria is satisfied:
            the detachment parameter has not attained the nominal detachment threshold in a first movement time;
            an attachment index is detected under specific evaluation conditions, the attachment index being that a measurement signal of the at least one wheel unit exhibits a particular shape representative of an attached state of the wheel unit.

2. The TPMS system as claimed in claim 1, in which each wheel unit comprises a radial accelerometer, wherein the detachment parameter for each wheel unit is a percentage of measured negative radial accelerations, calculated over a sliding window of measurements of radial acceleration based on a last radial acceleration measurement.

3. The TPMS system as claimed in claim 1, in which each of the at least one wheel unit comprises a radial accelerometer and is fixed on a rim or on a valve of a respective tire, wherein:
    the measurement signal used to evaluate the attachment index is a radial acceleration signal resulting from measurements performed by the radial accelerometer;
    a particular shape representative of the attached state is a sinusoid of amplitude lying between 0.7 g and 1.3 g;
    and the specific evaluation conditions are that the vehicle is in motion.

4. The TPMS system as claimed in claim 1, in which each of the at least one wheel unit comprises a radial accelerometer and is fixed inside a tread of a respective tire, wherein:
    the measurement signal used to evaluate the attachment index is a radial acceleration signal resulting from measurements performed by the radial accelerometer,
    a particular shape representative of the attached state is a substantially periodic presence of troughs corresponding to an imprint of the tire on the ground, which troughs have a maximum width $T_{FTP}$ and a periodicity $T_{360°}$ exhibiting a ratio $T_{FTP}/T_{360°}$ lying between 4% and 10%,
    and the specific evaluation conditions are that the radial acceleration is less than or equal to 4 g.

5. The TPMS system as claimed in claim 1, further comprising, for each of the at least one wheel unit:
    a state flag making it possible to record the detached state or the operational state of the at least one wheel unit, and
    a pressure flag $P_0$ making it possible to record an item of information according to which a pressure less than or equal to the reference atmospheric pressure has been measured by the wheel unit.

6. The TPMS system as claimed in claim 1, further comprising a diagnosis module configured to:
    calculate one or more level(s) of damage sustained by the at least one wheel unit declared detached, which is(are) chosen from among: a cumulative movement time which has elapsed since the at least one wheel unit was declared detached; a number of high-intensity shocks recorded for the at least one wheel unit since it was declared detached, a high-intensity shock being defined by a derivative of order 3 of a position of the at least one wheel unit which, in absolute value, is greater than or equal to 500 g/ms;
    compare each calculated level of damage with a corresponding predetermined threshold of damage.

7. The TPMS system as claimed in claim 6, wherein the return-to-service module of the TPMS system is moreover configured to, when the at least one wheel unit has been detected as being in the detached state, toggle the state of at least one the wheel unit from the detached state to the operational state if and only if, in addition to the first condition and the second condition, a third condition is also fulfilled, the third condition being that each calculated level of damage is less than or equal to the corresponding threshold of damage.

8. The system as claimed in claim 6, wherein the diagnosis module is configured to, moreover, command a modification of a sampling of an acceleration of the at least one a wheel unit declared detached so as to increase a frequency of the measurements of radial acceleration of the detached wheel unit so long as the vehicle is in motion.

9. The TPMS system as claimed in claim 1, wherein:
each of the at least one wheel unit comprises at least three counters for synchronizing operations of a microcontroller of the at least one wheel unit, these counters imposing different recurrences,
the return-to-service module is configured to:
trigger a first counter imposing a slowest recurrence when, the at least one wheel unit having been declared detached, the vehicle is in motion and no pressure less than or equal to the reference atmospheric pressure has been measured,
trigger a second counter imposing a fastest recurrence when, the at least one wheel unit having been declared detached, the vehicle is not in motion and a pressure less than or equal to the reference atmospheric pressure has been measured,
trigger a third counter imposing an intermediate recurrence when, the at least one wheel unit having been declared detached, the vehicle is not in motion and no pressure less than or equal to the reference atmospheric pressure has been measured.

10. The TPMS system as claimed in claim 1, wherein the reference atmospheric pressure is equal to 1.1 bar.

11. A method for returning to service a previously detached wheel unit, in a tire pressure monitoring system (TPMS) for checking a tire pressure of tires of an automotive vehicle comprising at least one wheel unit which can be in an operational state or in a detached state, a wheel unit of the at least one wheel unit being declared detached when a detachment parameter is greater than or equal to a predetermined nominal threshold of detachment,
wherein a state of the at least one wheel unit previously declared detached is toggled from the detached state to the operational state if and only if the following two conditions are fulfilled:

a first condition according to which, since the at least one wheel unit was declared detached, a pressure less than or equal to a reference atmospheric pressure has been measured by the at least one wheel unit while the vehicle was at rest,
a second condition according to which, after this rest, at least one of the following two criteria is satisfied:
the detachment parameter has not attained the nominal detachment threshold in a first movement time;
an attachment index is detected under specific evaluation conditions, the attachment index being the fact that a measurement signal of the at least one wheel unit exhibits a particular shape representative of the attached state of the wheel unit.

12. The method as claimed in claim 11, wherein each of the at least one wheel unit comprises a radial accelerometer and a measurement signal used to evaluate the attachment index is a radial acceleration signal resulting from measurements performed by this radial accelerometer.

13. The TPMS system as claimed in claim 2, in which each of the at least one wheel unit comprises a radial accelerometer and is fixed on a rim or on a valve of a respective tire, wherein:
the measurement signal used to evaluate the attachment index is a radial acceleration signal resulting from measurements performed by the radial accelerometer ($7a$-$7d$);
a particular shape representative of the attached state is a sinusoid of amplitude lying between 0.7 g and 1.3 g;
and the specific evaluation conditions are that the vehicle is in motion.

14. The TPMS system as claimed in claim 2, in which each of the at least one wheel unit comprises a radial accelerometer and is fixed inside a tread of a tire, wherein:
the measurement signal used to evaluate the attachment index is a radial acceleration signal resulting from measurements performed by the radial accelerometer,
a particular shape representative of the attached state is the substantially periodic presence of troughs corresponding to the imprint of the tire on the ground, which troughs have a maximum width $T_{FTP}$ and a periodicity $T_{360°}$ exhibiting a ratio $T_{FTP}/T_{360°}$ lying between 4% and 10%,
and the specific evaluation conditions are that the radial acceleration is less than or equal to 4 g.

* * * * *